United States Patent [19]

Nakashima

[11] Patent Number: 4,806,365

[45] Date of Patent: Feb. 21, 1989

[54] HEALTH VINEGAR

[75] Inventor: Todomu Nakashima, 7-go, 2-ban, Kasuga 4-chome, Kumamoto-shi, Kumamoto-ken, Japan

[73] Assignees: Todomu Nakashima, Kumamoto; Kishuyakushiume Kabushiki Kaisha, Wakayama, both of Japan

[21] Appl. No.: 92,404

[22] Filed: Sep. 1, 1987

[51] Int. Cl.$^4$ .............................. C12J 1/00; C12J 1/04
[52] U.S. Cl. ......................................... 426/17; 426/72
[58] Field of Search ................................... 426/17, 72

[56] References Cited

FOREIGN PATENT DOCUMENTS 1257179 11/1986 Japan ...................................... 426/17
2029963 2/1987 Japan ...................................... 426/17

OTHER PUBLICATIONS

Kirk-Othmer, Ency. of Chem. Tech., vol. 23, pp. 753-754 (1983).
The Ency. Americana, International Ed. (1986).
Lawrence, Taxonomy of Vascular Plants, Macmillan Publ. Co., Inc. NY, 1951 (p. 562).
Standley, Trees & Shrubs of Mexico, U.S. Natl. Herbarium, vol. 23, part 3; 1923 (p. 566).
Pantastico, Postharvest Physiology, handing and utilization of tropical and subtropical fruits and vegetables; AVI Publ. Co., 1975 pp. 483-484.

*Primary Examiner*—Marianne Cintins
*Attorney, Agent, or Firm*—Browdy & Neimark

[57] ABSTRACT

The present invention relates to a process for producing vitamin C-enriched health vinegar by adding acerola or a treated matter thereof during a step of manufacturing vinegar and/or to a vinegar product as well as the product so produced.

15 Claims, No Drawings

HEALTH VINEGAR

BACKGROUND OF THE INVENTION

1. Field of the Invention

The present invention relates to a process for producing cooking vinegar and more particularly, to a process for producing novel cooking vinegar which is greatly vitamin C-enriched by acerolas.

Therefore, the present invention is very important not only in ordinary food industries but also in various technical fields of health food, medicines and supplement nutrition food. In addition, the present invention has newly developed a field of utilizing acerolas and is of extremely great significance also in technical fields of horticulture and cultivation.

2. Brief Description of the Prior Art

Cooking vinegar is produced, irrespective of sake wine lees vinegar, rice vinegar, muscovado vinegar, grain vinegar, alcohol vinegar or wine vinegar, by acting an acetobactor on alcohol thereby to perform acetic fermentation. An attempt itself is out of question to add vitamin C susceptible to cleavage due to oxidation or decomposition; its technical problem per se to add vitamin C to cooking vinegar as in the present invention is quite novel and any technical idea of this type does not exist in the prior art.

Further in the present invention, acerolas are utilized as the source for vitamin C. However, acerolas get putrid and are ripened in an extremely short period of time and also for this reason, a manner of their utilization has not been established, much less utilization of acerolas in the technical field of cooking vinegar. Neither the prior art exists with such utilization nor could even one skilled in the art think of.

Therefore, an object of the present invention is to provide a process for producing hitherto unknown, ascorbic acid-enriched novel foodstuffs, i.e., ascorbic acid-enriched vinegar products.

In order to achieve the object described above and further in order to enrich vitamin C without injuring any properties principally possessed by cooking vinegar as natural seasoning, natural food and health food, extensive investigations have been made from various aspects of botany, horticulture, crop science, natural chemistry and other aspects, standing on a viewpoint that the only one effective means is to utilize natural matters.

Screening has thus been performed over a wide range with an attempt to make a survey on the most suitable raw materials among natural matters, taking into account various factors of compatibility with cooking vinegar, high vitamin C content, high storability of vitamin C, easy accessibility and simple production. As a result, it has come to discover for the first time that acerolas which are tropical or subtropical fruits successfully cultured also in the Okinawa and Amami islands recently are particularly suited for the purpose of the present invention. As a result of various investigations and researches based on this new discovery, it has been come to accomplish the present invention.

SUMMARY OF THE INVENTION

An object of the present invention is to provide a process for producing hitherto unknown, ascorbic acid-enriched novel foodstuffs, i.e., ascorbic acid-enriched vinegar products.

Namely, the present invention is particularly based on the quite novel and useful findings that acerolas are not only rich in vitamin C but also can transfer large qantities of vitamin C into vinegars and a key feature of the present invention lies in that vinegars are treated using the acerolas or treated matters thereof.

DETAILED DESCRIPTION OF THE PREFERRED EMBODIMENTS

Acerola is a shrub of the Malpighiaceae family native to the West Indian Islands and Puerto Rico which is a plant belonging to the Malpighia genus for example (*Malpighia punicifolia*). Acerola has an extremely high vitamin C content; as compared to a lemon, its fruit contains vitamin C as much as approximately 50 times and its fresh leaf as approximately 3 times.

The fruit of the acerola is edible but a rate of ripening and getting putrid is extremely rapid; only when the fruit is allowed to stand at normal temperature for 3 days, it is rapidly ripened and gets putrid, and no longer edible. As such, the acerola cannot be stored and it is also difficult to transport it to remote places so that there is no way to utilize it effectively except for consumption in a very small amount around producing districts. Even though attention is paid to vitamin C, vitamin C contained in a 100% fully ripened, edible fruit is lost to less than the half in a crude fruit and, natural vitamin C has not been effectively utilized.

In the present invention, an industrial use has been newly developed for such acerolas that required delicate handling as described above and were quite unsuited for any industrial use and, the source for natural vitamin C that was not sufficiently utilized so far can be effectively utilized, by organic combination with cooking vinegar which is natural health food and natural seasoning.

According to the present invention, acerolas can be utilized not only as a full ripe fruit but also as a crude fruit in the case of its fruit; further, vitamin C leached out of the fruit can also be utilized. In the case of its leaf, the leaf itself is edible and, large quantities of vitamin C leached out of the leaf and transferred into vinegar can also be effectively utilized. Accordingly, not only the fruit but the leaf can be freely utilized advantageously as long as it is an acerola; in addition, its crude fruit (green fruit) to fully ripened fruit and its fresh leaf to old leaf can be widely used. Further in the present invention, not only the fruit and leaf of the acerola described above but also treated matters thereof (hereafter sometimes simply referred to as "acelora") can also be freely used like the acelora. Examples of the treated matters include a ground matter, squeezed liquid, leas, extract, crumpled matter, concentrate, paste and dried matter of the acelora.

The present invention is performed by adding the acerola during any stage of manufacturing cooking vinegar and/or to the produced vinegar.

For example, in the case of alcohol vinegar, nutrition sources of an Acetobacter are supplemented to a diluted alcohol and seed vinegar is added thereto to perform the charging; at the stage of this charging, the acerola may be added. Subsequently, acetic fermentation is performed and at this stage, the acerola may also be added.

In the case of sake wine lees vinegar, the acerola treatment may be performed during steps of adding water to a sake wine lees and subjecting the mixture to alcohol fermentation; alternatively, a filtrate of the alcohol fermentation liquid or a boiling liquid obtained by heating the filtrate may also be subjected to the acerola treatment or the acerola treatment may also be performed at any stage of a charging step using seed vinegar and an acetic fermentation step subsequent thereto.

Further in the case of rice vinegar, the acerola treatment may be performed at any stage of a saccharization step using koji or malted rice and steamed rice, an alcohol fermentation step subsequent thereto carried out by adding mother sake wine and an acetic fermentation step carried out by adding seed vinegar at the end of alcohol fermentation step.

Also in the case of muscovado vinegar prepared by alcohol fermentation of muscovado sugar, which is a kind of non centrifugal sugar produced in the Okinawa Island or the Amami Great Island, followed by acetic fermentation, the acerola treatment may performed at any stage of each step of the alcohol fermentation and each step of the acetic fermentation.

After completion of the acetic fermentation, a ripening step is required; during the course of this ripening step, the acerola treatment may also be performed or, also by addition of the acerola to the produced cooking vinegar, the desired object of the present invention can be achieved.

Likewise, the present invention is advantageously applicable also to various kinds of vinegar such as maltose vinegar, apple vinegar, grape vinegar and distilled vinegar. In view of the same or nearby producing districts, both being no sense of incompatibility with each other and a synergistic property in terms of health food, vitamin C enrichment of muscovado vinegar with the acerola provides a particularly high effectiveness.

As has been described above, the present invention can provide a variety of vinegar products enriched with vitamin C by the acerola treatment and can also provide more excellent health vinegar products which are produced by medical herb-treated medical herb cooking vinegar products enriched with vitamin C.

To produce such vinegar products, a treatment with medical herbs may be performed at any stage during a step of manufacturing cooking vinegar and a ripening step or, to cooking vinegar products. The medical herb treatment is carried out, after drying various medical herbs in the sun or in the shadow in a fresh state, grinding them or extracting effective ingredients from them and adding the ground one or the effective ingredients.

Any medical herbs can be freely used as far as they are compatible with cooking vinegar and do not destroy vitamin C, and this point is also characteristic of the present invention. For example, a nandin, a cranesbill, a Houttuynia herb, a bracket fungus, Fomes japonicus, a Chinese matrimony vine, siler divaricata, a cassia bark, a Japanese angelica root, a clove, a rhemannia root, a herbaceuos peony, a green pine needle, a kaki leaf, a mugwort leaf, a thistle leaf, a licorice, a Guinea pepper, a green loquat leaf, a rhubarb, oventar benzoar, a ginseng, Trimeresurus gramiheus, a cinnamon, a balloonflower, a cinchona and other medical herbs can be widely used but the present invention is not limited to these medical herbs. An amount of the medical herb to be used is approximately 0.0001 to 10 g based on 10 liters of the cooking vinegar product; in the case of a bracket fungus and a Guinea pepper, particularly preferred is 0.0005 to 0.005 g, with approximately 0.001 g being more preferred. In the case of the other medical herbs, preferred is 0.001 to 0.5 g, with approximately 0.05 g being more preferred. Irrespective of using medical herbs, the range of the acerola to be used is not particularly limited but the acerola can be used in a range of approximately 1% to 100% based on the raw cooking vinegar. The acerola is extremely highly compatible with cooking vinegar products and can enrich only vitamin C without causing unpleasant taste and odor to the cooking vinegar products so that the amount of the acerola used may also be further increased, if necessary.

By immersion over several months, not only vitamin C can thus be enriched but also can various components in the medical herbs be extracted into the cooking vinegar to mix therewith. For example, "nandin" is effective for a peptic, an antitussive, hangover, eye diseases and throat pain; "cranesbill" for antilaxative, gripes, habitual chills and female disorders; and "Houttuynia herb" for a diuretic, evacuation and adsorbent, prophylaxis of hypertension, etc. These ingredients are fused or mixed with each other to exhibit extremely excellent efficacies.

According to the present invention, not only vinegar for medical use but also any of ordinary cooking vinegar, fermentation vinegar and acetic vinegar can thus be greatly enriched with vitamin C stably over a long period of time.

In case that a dressing, a mayonaise, etc. are prepared using the vitamin C-enriched cooking vinegar obtained by the present invention, vitamin C-enriched dressing, mayonaise, etc. can be obtained.

EXAMPLE 1

Firstly, alcohol (95%), water and seed vinegar (5%) were mixed in a ratio of 1:2:4 to prepare modified alcohol.

The thus prepared modified alcohol, 7.5 l, 8.5 l of seed vinegar, 1.5 l of sake wine lees and 10 l of hot water were mixed to prepare a charge mixture. To the charge mixture was added 3 kg of acerola (fruit), which was subjected to acetic fermentation by a conventional stationary method for 1.5 months. Subsequently, ripening was performed for 2.5 months while stirring twice a day to obtain vitamin C-enriched alcohol vinegar. EXAMPLE 2

After water was added to muscovado originated from the Amami Great Island and the thus prepared muscovado was heated, alcohol fermentation was carried out in a conventional manner.

The thus obtained muscovado fermentation liquid was filtered and the filtrate (supernatant) was separated. A part of the supernatant was heated to 70° C. to make a boiling liquid. Five liters of seed muscovado vinegar separately prepared, 2.5 l of the supernatant and 2.5 l of the boiling liquid were charged and changed to vinegar by a stationary method in a conventional manner.

Main fermentation was discontinued and after the temperature was lowered to normal temperature, 1 kg of acerola (fruit) was added thereto followed by ripening for 3 months. Purification and filtration were carrid out to give a vitamin C-enriched muscovado vinegar. The separated green acerola became edible and a promising utility was developed for the fruit which had no commercial value.

EXAMPLE 3

To 10 l of commercially available wine vinegar was added 700 g of acerola (100% fully ripened fruit). The mixture was stored and ripened at normal temperature for a month to prepare a vitamin C-enriched product.

EXAMPLE 4

Upon preparation of muscovado vinegar in a conventional manner, 70 g of acerola (fruit) and 0.005 each of a nandin and a cranesbill (both dried) were added to 1 l of muscovado vinegar during the ripening step and soaked therein for 3 months to give vitamin C-enriched medical herb muscovado vinegar extract.

EXAMPLE 5

Upon the stationary fermentation in Example 1, 5 kg of acerola (fresh leave) was further added and the mixture was treated as in Example 1 to give vitamin C-enriched, delicious cooking vinegar.

EXAMPLE 6

Hundred ml of vitamin C-enriched wine vinegar obtained in Example 3 was mixed with 30 ml of corn salad oil to give a vitamin C-enriched dressing.

While the invention has been described in detail and with reference to specific embodiments thereof, it will be apparent to one skilled in the art that various changes and modifications can be made therein without departing from the spirit and scope thereof.

What is claimed is:

1. A process for producing a vitamin C-enriched cooking vinegar comprising the step of adding acerola to cooking vinegar in an amount of from 1 to 100% based on the weight of the cooking vinegar.

2. The process of claim 1, wherein said acerola added is fruit of said acerola.

3. A process for producing a vitamin C-enriched cooking vinegar comprising the steps of:
   fermenting a starting material for cooking vinegar in the presence of Acetobacter so as to produce an unripened cooking vinegar;
   ripening said unripened cooking; and
   adding from 1 to 100% acerola, based on the weight of said vinegar, to said starting material, said unripened vinegar, or said ripened vinegar.

4. The process of claim 3, wherein said starting material comprises a product of alcoholic fermentation.

5. The process of claim 3, wherein said starting material is subject to alcoholic fermentation prior to said fermentation by Acetobacter and wherein said acerola is added prior to said alcoholic fermentation.

6. The process of claim 3, wherein said acerola added is fruit of said acerola.

7. the process of claim 3, wherein said acerola is added prior to said ripening.

8. The process of claim 6, wherein said acerola fruit is added prior to said ripening.

9. The process of claim 6, wherein said acerola fruit is added prior to said fermentation by Acetobacter.

10. The process of claim 6, wherein said acerola fruit is added after said ripening.

11. A process for the production of vitamin C-enriched cooking vinegar comprising the steps of fermenting a starting material for the production of cooking vinegar in the presence of Acetobacter to produce unripened cooking vinegar; and
    adding from 1 to 100% acerola fruit, based on the weight of said unripened cooking vinegar, to said starting material or unripened cooking vinegar.

12. The process of claim 11, wherein said acerola fruit is added to said starting material.

13. The process of claim 11, wherein said acerola fruit is added to said unripened cooking vinegar.

14. A vitamin C-enriched cooking vinegar comprising cooking vinegar and from 1 to 100% acerola based on the weight of said cooking vinegar.

15. The cooking vinegar of claim 14, wherein said acerola is acerola fruit.

* * * * *